US011675739B1

(12) United States Patent
Schenk et al.

(10) Patent No.: US 11,675,739 B1
(45) Date of Patent: Jun. 13, 2023

(54) DISTRIBUTED DATA STORAGE USING HIERARCHICALLY ARRANGED METADATA

(71) Applicant: Datex Inc., Mississauga (CA)

(72) Inventors: Derek Schenk, Acton (CA); Ed Leavens, Toronto (CA)

(73) Assignee: Datex Inc., Mississauga (CA)

( * ) Notice: Subject to any disclaimer, the term of this patent is extended or adjusted under 35 U.S.C. 154(b) by 223 days.

(21) Appl. No.: 16/579,379

(22) Filed: Sep. 23, 2019

(51) Int. Cl.
*G06F 16/14* (2019.01)
*G06F 16/13* (2019.01)
*G06F 16/901* (2019.01)
*G06F 16/16* (2019.01)
*H04L 9/08* (2006.01)

(52) U.S. Cl.
CPC .......... *G06F 16/148* (2019.01); *G06F 16/134* (2019.01); *G06F 16/164* (2019.01); *G06F 16/9027* (2019.01); *H04L 9/0822* (2013.01)

(58) Field of Classification Search
CPC .... G06F 16/148; G06F 16/164; G06F 16/134; G06F 16/9027; H04L 9/0822
USPC ....................................................... 707/741
See application file for complete search history.

(56) References Cited

U.S. PATENT DOCUMENTS

| 10,650,146 | B1* | 5/2020 | Gaurav | G06F 21/562 |
| 2009/0106255 | A1* | 4/2009 | Lacapra | G06F 16/182 |
| 2016/0026672 | A1* | 1/2016 | Zhang | G06F 16/13 |
| | | | | 707/686 |
| 2016/0062843 | A1* | 3/2016 | Li | G06F 16/122 |
| | | | | 707/646 |
| 2017/0272100 | A1* | 9/2017 | Yanovsky | G06F 16/1752 |
| 2017/0272209 | A1* | 9/2017 | Yanovsky | G06F 12/1466 |

FOREIGN PATENT DOCUMENTS

WO WO-0114948 A2 * 3/2001 ......... G06F 16/9027

OTHER PUBLICATIONS

"Google Cloud Security Whitepapers", Mar. 2018 (97 pages).
https://info.townsendsecurity.com/definitive-guide-to-encryption-key-management-fundamentals, "The Definitive Guide to Encryption Key Management", accessed on Apr. 29, 2019 (32 pages).
https://security.stackexchange.com/questions/160868/file-encryption-design, "File Encryption Design", accessed on Apr. 29, 2019 (9 pages).
https://security.stackexchange.com/questions/93886/dek-kek-and-master-key-simple-explanation, "DEK, KEK, and Master Key—Simple Explanation", accessed on Apr. 29, 2019 (5 pages).

* cited by examiner

*Primary Examiner* — Shahid A Alam

(57) ABSTRACT

Files are striped across multiple disparate data repositories. Metadata is stored hierarchically in a tree data structure to allow retrieval and reassembly of the files from the multiple repositories. The metadata is at least partially encrypted. The hierarchical tree data structure may be traversed without decrypting file identifying information. In this way, a file storage coordinator may quickly traverse the metadata without compromising the security of the striped files. Identification and retrieval of files associated with the metadata requires access to a decryption key, generally unavailable to the file storage coordinator. The metadata may be striped across the repositories in much the same way as the files are striped.

18 Claims, 14 Drawing Sheets

```
{
  "vault-id": 100,
  "id": 0,
  "parent-id": 0,
  "user-id": 100,
  "group-id": 1000,
  "permission-bits": 660,
  "revision": 1,
  "status": "active",
  "type": "directory",
  "encryption": {
    "kek-id": "1",
    "dek": "kek[1](dek)"
  },
  "secure-data": "dek(binary)"
},
{
  "vault-id": 100,
  "id": 1,
  "parent-id": 0,
  "user-id": 100,
  "group-id": 1000,
  "permission-bits": 660,
  "revision": 1,
  "status": "active",
  "type": "directory",
  "encryption": {
    "kek-id": "1",
    "dek": "kek[1](dek)"
  },
  "secure-data": "dek(binary)"
},
```

Fig. 5A

```
[
  {
    "id": 20,
    "parent-id": 1,
    "user-id": 100,
    "group-id": 1000,
    "permission-bits": 660,
    "revision": 1,
    "encryption": {
      "kek-id": "1",
      "dek": "kek[1](dek)"
    },
    "secure-data": {
      "name": "Directory-Y",
      "createdt": "date",
      "updatedt": "date",
      "file-size": 0,
      "block-size": 0,
      "block-id": "",
      "meta-data": {
      }
    }
  },
  {
    "id": 21,
    "parent-id": 20,
    "user-id": 100,
    "group-id": 1000,
    "permission-bits": 660,
    "revision": 1,
    "encryption": {
      "kek-id": "1",
      "dek": "kek[1](dek)"
    },
    "secure-data": {
      "name": "FileA.doc",
      "createdt": "date",
      "updatedt": "date",
      "file-size": 1023451,
      "block-size": 4096,
      "block-id": "GUID",
      "meta-data": {
        "entry": {
          "name": "classification",
          "value": "sensitive"
        }
      }
    }
  }
]
```

Fig. 5B

```
{
  "vault": {
    "id": 100,
    "name": "Shared Drive",
    "metadata": {
      "providers": [
        {
          "id": "local-redis-1",
          "type": "redis",
          "connection": {
            //This is a TCP connection to a local REDIS cache provider
            "host": "redis.local",
            "port": 6379,
            "prefix": "metadata1"
          }
        },
        {
          "id": "azure-blob-1",
          "type": "azure",
          "connection": {
            //HTTPS connection to Azure
            "protocol": "https",
            "blobEndpoint": "storagesample.blob.core.windows.net",
            "port": 443,
            "accountName": "metadata1",
            "accountKey": "<secret-key>"
          }
        },
        {
          "id": "aws-s3-1",
          "type": "s3",
          "connection": {
            //HTTPS connection to AWS
            "protocol": "https",
            "endpoint": "s3.eu-west-1.amazonaws.com",
            "accessKey": "<access-key>",
            "secret": "<secret>",
            "bucket": "metadata1"
          }
        }
      ]
    },
    "blocks": {
      "settings": {
        //Set the block size and settings for each file size range
        "ranges": [
          {
            "from": "0KB",
            "to": "128KB",
            "blockSize": "2KB"
          },
```

Fig. 10A

```
    {
      "from": "128KB",
      "to": "512KB",
      "blockSize": "4KB"
    },
    {
      "from": "512KB",
      "to": "2MB",
      "blockSize": "8KB"
    },
    {
      "from": "2MB",
      "to": "10MB",
      "blockSize": "16KB"
    },
    {
      "from": "10MB",
      "to": "100MB",
      "blockSize": "32KB"
    },
    {
      "from": "100MB",
      "to": "1PB",
      "blockSize": "64KB"
    }
  ]
},
"encryption": {
  "kek": {
    //Key Encrypting Key Settings
    "id": "md_key_1",
    "aglo": "ecc",
    "detail": "p-521"
  },
  "dek": {
    //Data Encrypting Key Setup
    "algo": "aes",
    "detial": "256"
  }
},
"disperalSettings": {
  //Define the number of fragments to create, and how many are needed to reconstruct
  "width": 4,
  "require": 3
},
//Configure block providers to store the fragments
"providers": [
  {
    "id": "azure-blob-1",
    "type": "azure",
    "connection": {
```

Fig. 10B

```
      "protocol": "https",
      "blobEndpoint": "storagesample.blob.core.windows.net",
      "port": 443,
      "accountName": "storage1",
      "accountKey": "<secret-key>"
    }
  },
  {
    "id": "azure-blob-2",
    "type": "azure",
    "connection": {
      "protocol": "https",
      "blobEndpoint": "storagesample.blob.core.windows.net",
      "port": 443,
      "accountName": "storage2",
      "accountKey": "<secret-key>"
    }
  },
  {
    "id": "aws-s3-1",
    "type": "s3",
    "connection": {
      "protocol": "https",
      "endpoint": "s3.eu-west-1.amazonaws.com",
      "accessKey": "<access-key>",
      "secret": "<secret>",
      "bucket": "storage1"
    }
  },
  {
    "id": "aws-s3-2",
    "type": "s3",
    "connection": {
      "protocol": "https",
      "endpoint": "s3.eu-west-1.amazonaws.com",
      "accessKey": "<access-key>",
      "secret": "<secret>",
      "bucket": "storage2"
    }
  }
 ]
 }
 }
}
```

DISTRIBUTED DATA STORAGE USING HIERARCHICALLY ARRANGED METADATA

TECHNICAL FIELD

This relates to remote storage of data, and more particularly to methods, devices and systems for securely storing data remotely by securely distributing data across multiple data repositories.

BACKGROUND

Remote network storage has become a preferred data storage model. Third party hosted storage—known as "cloud storage"—is also becoming common place.

Known cloud storage services include services like Amazon S3, Oracle Cloud Storage and Microsoft Azure Storage. Cloud storage typically includes many distributed resources, but still acts as one, either in a federated or similar architecture.

Cloud storage is preferred as it off-loads data storage to third party providers, and typically provides fault tolerance through redundancy and distribution of data along with the facility for versioned copies.

At the same time, however, reliance on third party providers causes concerns for those that own or control the storage of the data (data subjects or data controllers). Data is stored with a single provider that possibly has access to the data. Moreover, the location of storage of the data is often not in the control of the data subject or data controller, possibly making it vulnerable to seizure of foreign governments or national.

Accordingly, there is a need for novel remote data storage that provides greater control and distribution of such data storage.

SUMMARY

Exemplary of the present invention, file data in files is striped across multiple disparate data repositories. No single repository has sufficient data to allow reconstruction of a file. Metadata is stored hierarchically in a tree data structure to allow retrieval and reassembly of the file(s) from the multiple repositories. The metadata is at least partially encrypted. The hierarchical data may be traversed without decrypting file identifying information. In this way, a file storage coordinator may quickly traverse the metadata without compromising the security of the striped files. Identification and retrieval of files associated with the metadata requires access to a decryption key, generally unavailable to the file storage coordinator. The metadata may be striped across the repositories in much the same way as the files are striped.

According to an aspect, there is provided a method of storing data in multiple data repositories, comprising: storing, for access by a storage coordinator, a tree data structure having a plurality of hierarchically arranged nodes, wherein each of the hierarchically arranged nodes is associated with a file and contains metadata about that file, and wherein each file is striped across several of the multiple data repositories; wherein each of the nodes is at least partially encrypted, and contains sufficient metadata to allow traversal of the tree structure to an adjacent one of the hierarchically arranged nodes, and retrieval of the file associated with that node from the multiple data repositories.

According to another aspect, a method of storing a file across multiple data repositories, comprising: forming file metadata identifying the file within a directory structure; including a link in the file metadata linking it to metadata associated with at least one other file in a tree data structure of hierarchically arranged nodes; encrypting a portion of the file metadata identifying the file and allowing retrieval of the file from the multiple data repositories; appending the partially encrypted file metadata to the tree data structure and storing the tree data structure As will be appreciated, a non-transitory computer readable medium may store computer executable instructions that when performed by at least one computing device may cause the computing device to perform the methods described herein.

Other features will become apparent from the drawings in conjunction with the following description.

BRIEF DESCRIPTION OF THE DRAWINGS

In the figures which illustrate example embodiments,

FIGS. 5A and 5B illustrate example JSON metadata of the tree data storage of FIG. 5; FIGS. 10A-10C illustrate example configuration JSON metadata

DETAILED DESCRIPTION

Figure 1:
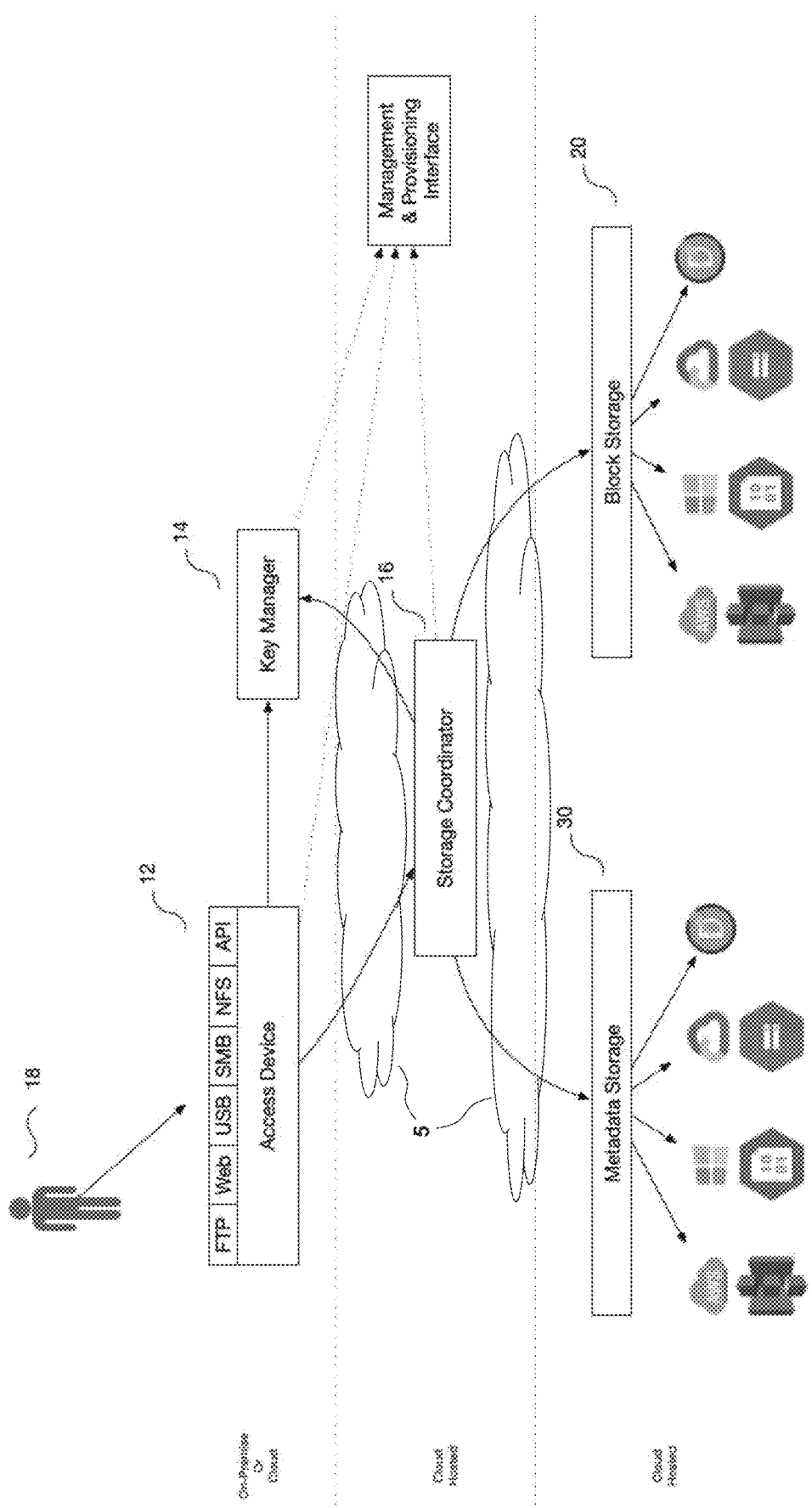
FIG. 1 is a block diagram of a computing environment for distributing and storing data in manners exemplary of the present invention.

FIG. 1 is a block diagram of a computing environment 10. Computing environment 10 includes an access device 12 in communication with a key management device 14, further in communication with a storage coordinator 16. Storage coordinator 16 is further in communication with multiple distinct storage repositories 20-1, 20-2, . . . 20-$n$ (individually and collectively repositories 20). An end-user device 18 may further be in communication with access device 12.

Access device 12; key management device 14; storage coordinator 16 and storage repositories 20 are in communication with each other by way of one or more computer network(s) 5. Network 5 may be a packet switched data network, and may be any combination of local networks (LANs), wide area networks (WANs), and typically includes the public internet. Network 5 may include wired, fiber optic, wireless and other links. Network 5 may further interconnect one or more local area networks interconnecting end-user device 18 to other devices locally. For example, a corporate local area network may locally interconnect end-user device 18 to other similar computing devices, local database servers, accounting servers, and the like.

End-user device 18 is a conventional computing device in the form of a personal computer or mobile device, known to those of ordinary skill in the art. Example mobile devices include without limitation, cellular phones, cellular smartphones, wireless organizers, personal digital assistants, computers, laptops, handheld wireless communication devices, wirelessly enabled notebook computers, portable gaming devices, tablet computers, or any other portable electronic device with processing and communication capabilities. End-user device 18 as referred to herein can also include without limitation, peripheral devices such as displays, printers, touchscreens, projectors, digital scanners and other types of auxiliary devices that may communicate with another computing device.

End-user device 18 is in communication with access device 12. End-user device 18 hosts a conventional operating system to allow basic communication and application operations related to end-user device 18. Generally, the operating system is responsible for determining the functions and features available at end-user device 18, such as keyboards, touch screen, synchronization with applications, email, text messaging and other communication features as will be envisaged by a person skilled in the art. In an embodiment, the operating system at end-user device 18 may be an Android™ operating system software, Linux operating system software, BSD derivative operating system software, iOS™ operating system software, Windows™ or any other suitable operating system software, that is capable of file reads and file writes using suitable file system APIs and/or protocols.

End-user device 18 further executes a suitable client that allows access to an external or remote file system. For example, end-user device 18 may be capable of file reads and file writes using the FTP; HTTP; SMB; AFP; NFS; SFTP; UPnP; or AFS protocol; or the like, and may include a suitable software client allowing such file reads/writes.

From the perspective of end-user device 18, access device 12 presents a conventional file system to allow an operating system at end-user device 18 to read and write files in a conventional manner without modification, using a suitable file storage protocol or API. Access device 12 provides the required protocol or API, but obtains and stores data—including metadata about stored data (i.e. files) and directories through storage coordinator 16.

Access device 12 manages files hierarchically, in much the same way as such files would be stored in a file system. A single hierarchically arranged set of files and directories is referred to as a vault.

In overview, access device 12 presents a conventional file system to end-user device 18. End-user device 18 can read and write files to such file system. Access device 12 divides individual files into blocks, and encrypts these. Individual encrypted blocks are presented to storage coordinator 16. Each block is divided into multiple fragments by storage coordinator 16. Fragments are striped or dispersed across remote storage repositories 20.

Metadata defining configuration of the vault, and metadata that allows location of fragments and reassembly of fragments into blocks, and ultimately files is also stored. The metadata associated with the files is arranged hierarchically, and can be stored in the same way as the blocks that make up the files themselves.

Encryption used by access device 12 and storage coordinator 16 uses both symmetric encryption keys to be used as data encrypting keys, and asymmetric encryption keys to be used as key encrypting keys, used to encrypt the data encryption keys (DeKs). Asymmetric keys are stored at key management device 14, and used to encrypt DeKs, while encrypted versions of DeKs are stored elsewhere.

Each vault is associated with at least one cryptographic key, unique to the vault (referred to herein as a KeK). In the depicted embodiment, at least one asymmetric private/public key pair is associated with the vault.

Retrieval or use of the KeKs can only be performed by an authorized user of key management device 14. Use of a KeKs requires knowledge of the vault of interest, and authentication of the user (typically through access device 12) at key management device 14.

DeK's are randomly generated at both access device 12, and storage coordinator 16. DeK's are further encrypted using KeKs, and are stored in encrypted format—typically with metadata for the file.

Data blocks, created by access device 12 are encrypted using a DeK as generated by access device 12. This DeK is further encrypted by key management device 14 using the KeK of the vault and is included in stored metadata. Each file may use one or more DeK's, or variations of the DeK (such as XOR of the DeK with a value such as the block number).Optionally, blocks are further encrypted using a DeK generated by the storage coordinator 16 before fragmentation. The block DeK is further encrypted using a KeK and securely stored with the fragments. The encrypted form of the DeK can be stored with the fragment by appending it to the encrypted block, so that the fragments, after erasure coding, each contain some portion of the original encrypted DeK. Once erasure coding is reversed the original encrypted DeK may be obtained. Alternatively, the key at the front so the pre-dispersal data is [KeK(DeK)]+[KeK−id]+[DeK (block)

Storage coordinator 16 provides metadata from storage to access device 12 and further provides data from repositories 20, as further detailed below. Metadata may be stored locally or remote from storage coordinator 16. In an embodiment, metadata is stored at repositories 20 in much the same way as other blocks of data is stored at repositories 20.

Access device 12 provides the data using the expected file storage protocol to end-user device 18. Access device 12 manages files hierarchically, in much the same way as such files would be stored in a file system.

Access device 12 may be co-located with end-user device 18, and thus locally hosted. It may be in communication with end-user device 18, by way of a peripheral link—such as a USB or similar port, or by way of a network connection, that may be wired or wireless. In alternate embodiments, access device 12 may be remotely hosted, accessible by end-user device 18 by way of network 5.

On-line storage repositories 20 are network accessible data storage repositories that may be provided by third party service providers, or may be privately hosted network accessible storage devices, or a combination thereof. Suitable on-line storage repositories 20 include Amazon AWS; Microsoft Azure; Google Cloud; Redis; Memcache; Database Table or any other network accessible storage. Each on-line storage repository is accessible using a published API. Typically, data is managed in buckets or blobs or objects—preconfigured using the API. For purposes of explanation, the term bucket will be used generically to describe such organization of data in a repository 20. An example bucket may be considered a data repository that hosts data in data records of a pre-defined size, with each data record being indexed by a unique key. Stored data records may be retrieved from a bucket using the API by identifying a desired data record by its unique key. Data may be added to a bucket by associating the data with a new unique key. Typically, but not necessarily, each data record has a pre-defined size. Viewed this way, buckets may be treated as two dimensional data structures.

Each of repositories 20 is preconfigured—using for example a configuration interface 22 hosted at an arbitrary computing device. The configuration interface allows definition of which repositories 20 are to be used for a particular vault, and may further define encryption keys and record sizes to be used for files in each vault. The configuration of repositories 20 may be stored as vault metadata. The vault configuration is created at interface 22, and may be separately stored, either at device that hosts interface 22 or otherwise. That device will store these configurations in a database or other storage format, and can be retrieved by storage coordinator 16 using an API call—e.g. getVaultConfiguration(vaultId).

Example vault metadata, in JavaScript Object Notation (JSON) is depicted in FIGS. 11A-11D. As will be appreciated example metadata is illustrative only. Metadata need not be stored in JSON, but may take any other suitable form. As illustrated in FIG. 11A, vault metadata is associate with a vault identifier (vault-id 100). Vault metadata further identifies numerous storage repositories used for the vault. In the example metadata a REDIS; AZURE; AWS repositories are used. Block sizes used for files in the vault are defined. Further the type of data encryption keys (e.g. number of bits) used may be set. As well, a unique identifier identifying the vault KeK at key management device 14 may be stored. Dispersal parameters defining how data is to be fragmented are also identified. In the example dispersal parameters require each block to be stored in four fragments, of which only three are required to reconstruct a block. Finally, metadata identifying how metadata is to be dispersed across repositories 20 is provided. In this way, the dispersal of metadata for a vault may be different than dispersal of blocks within the repository itself.

Figure 2:
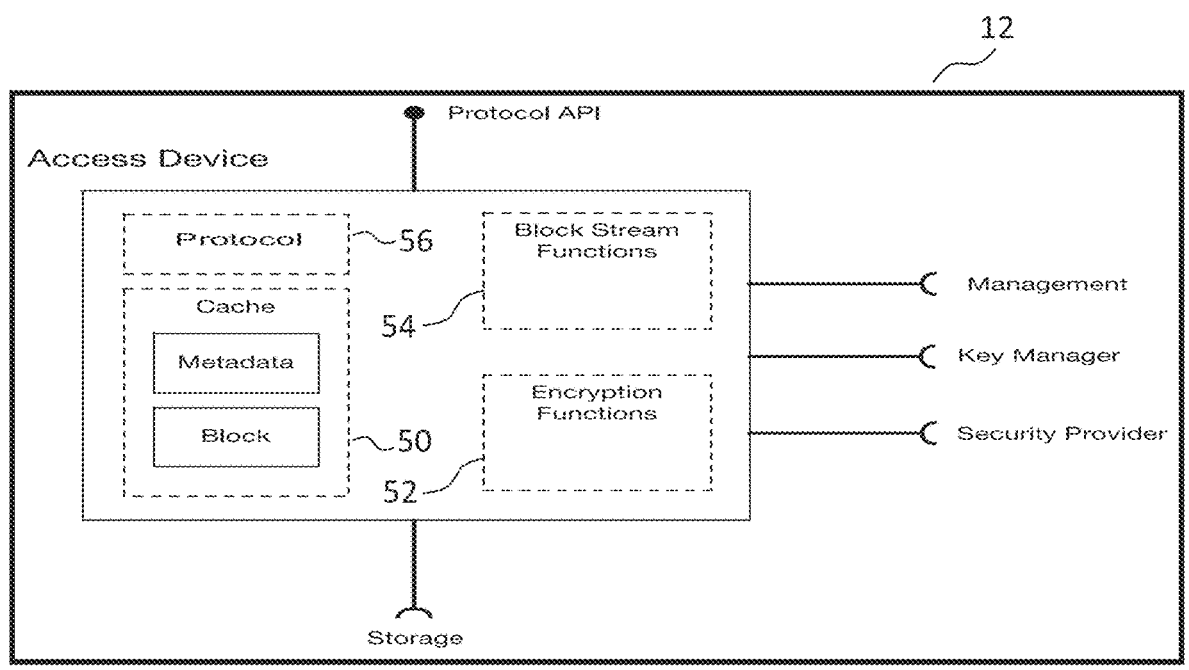
FIG. 2 is a functional block diagram of an access device of the environment of FIG. 1.

An example functional block diagram of an access device 12 is illustrated in FIG. 2. Access device includes a cache 50 for caching data and metadata and. Access device 12 further includes an encryption block 52 and a block data streaming block 54. Access device 12 further includes an API, or protocol block 56 that allows access device 12 to appear as a file system to an interconnected computing device, like end-user device 18. Access device 12 is further in communication, or includes, a data store (not shown) for storage of metadata, and is further in communication with key management device 14 to store and retrieve encryption/decryption keys.

Access device 12 may be implemented as a general purpose computing device, and may for example be formed as a single board programmable microcontroller, programmed to provide cache 50 and functional blocks 52 and 54 and in communication with an end user computing device. In an example embodiment, access device 12 may be formed as a Raspberry Pi single board computing device, and may host suitable operating system software—such as Linux, and further provide one or more file access protocols modified as described herein.

For example, protocol block 56 of access device 12 may provide an FTP; HTTP; SMB; AFP; NFS; SFTP; UPnP; AFS or similar file storage protocol accessible through a suitable physical port, access device 12 to act as a host to an interconnected end-user device 18. A suitable application program interface (API) may also be provided. The file storage protocol typically allows for file open, file reads, file writes, and file closing, and further provides directory services—including file naming, and/or access restrictions, and directory storage. In an embodiment, a file system protocol may be accessible through a network port, or a USB port by an end user computing device. As required, access device 12 may host a network protocol stack to allow access device to access other computing devices in computing environment 10.

In alternate embodiments, access device 12 may be integrated in an end-user computing device using suitable software that co-exists with end user and operating system at an end user device. For example access device 12 may be formed as part of an end-user computing device that already hosts a suitable operating system, such as a Windows, Linux, UNIX, or other suitable operating system. Functionality of access device 12 described herein may be provided in software at such an end user device. In an example embodiment, the functionality of access device 12 may be provided in software at end-user device 18.

In alternate embodiments, access device 12 could also be virtualized and hosted on a remote server, or its functionality could be provided as software as a service.

Access device 12 is further in communication with key management device 14. Key management device 14 includes suitable key management software that serves encryption keys (or encrypted data) upon request, and allows key retrieval or data decryption by properly authenticated devices. An interconnected device—such as access device 12—may request generation, storage, and retrieval or application of stored encryption keys.

Figure 3:
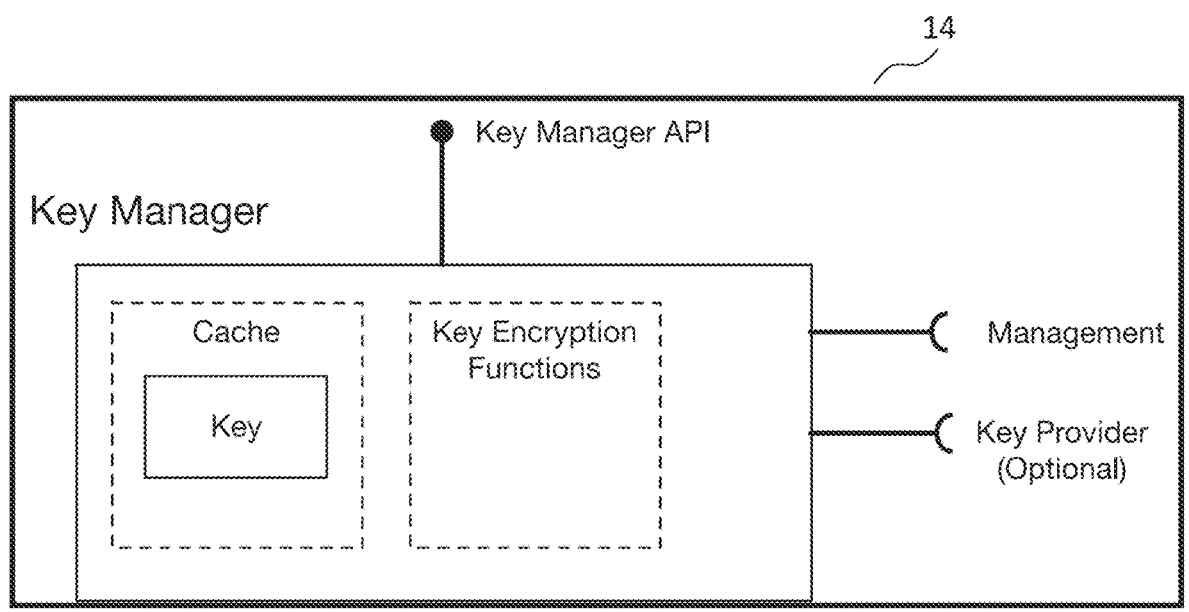
FIG. 3 a functional block diagram of an storage controller of the environment of FIG. 1.

An example functional block diagram of a key management device 14 is illustrated in FIG. 3. Key management device 14 may be configured through appropriate software to provide encryption key-related functions such as the generation of symmetric encryption keys, and the creation, storage, and application of asymmetric encryption keys. For example, it may include such functions as:

GenerateDataEncryptionKey()which returns symmetric key;
Encrypt(plaintext, keyIdentifier) which returns ciphertext;
Decrypt(ciphertext, keyIdentifier) which returns plaintext;
GetPublicKey(keyIdentifier); and
GenerateKeyEncryptionKey( )which returns an identifier of KeK.

Figure 4:
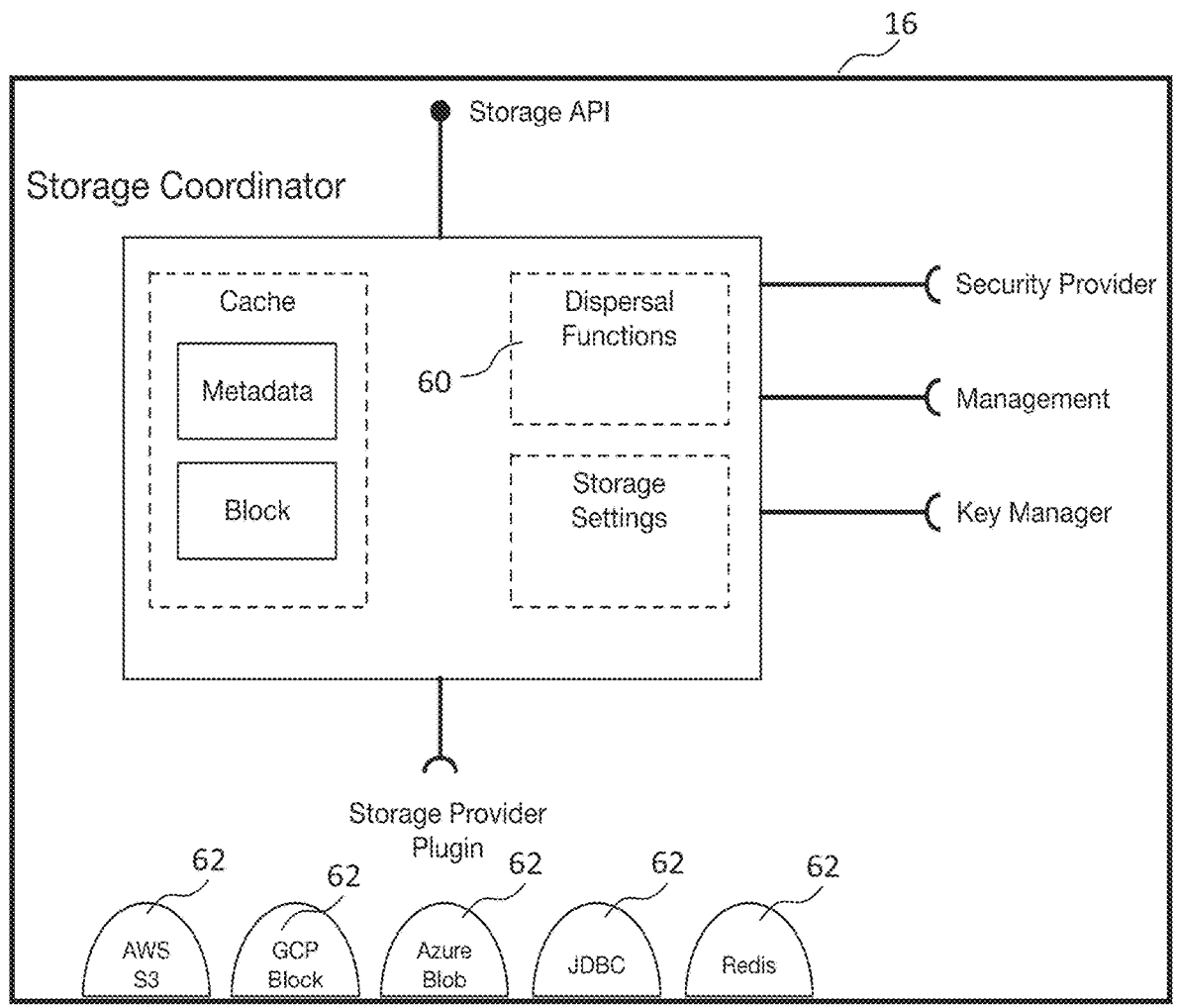
FIG. 4 a functional block diagram of an key management device of the environment of FIG. 1.

An example functional block diagram of a storage coordinator 16 is illustrated in FIG. 4. Storage coordinator 16 takes the form of a general purpose computing device, hosting software adapting it to function as described herein. Storage coordinator 16 may for example take the form of a network server, including a processor, persistent and dynamic memory, and suitable input/output interfaces including a network interface allowing storage coordinator 16 to communicate with access device 12; key management device 14; and storage repositories 20 over network 5.

In alternate embodiments the functions of storage coordinator 16 may be virtualized at a remote computing device, and/or provided as a service by a remote computing device accessible by way of network 5.

To that end, storage coordinator 16 may store and execute a suitable data splitting (often referred to as dispersal) function 60. Data splitting function 60 takes individual blocks of data, and divides each block into M fragments, of which N are required to reconstruct the M fragments, using a cryptographic transform. In the depicted embodiment, data splitting function 60 takes each block, encrypts it with a random key; hashes the resulting cyphertext using a known have hash function; XORs the random key with the hash; and appends the XORd random key to the block. The result block and key, is divided into M fragments (of which N are required for reconstruction, N≤M), using erasure coding. Other dispersion algorithms may also be used.

Storage coordinator 16 receives data to be stored by access device 12 (typically initially received from end-user device 18), encrypts, and distributes the data across repositories 20. As described below, storage coordinator 16 further includes software to allow the retrieval of data stored across repositories 20 for provision (typically in encrypted form) to access device 12.

As noted, storage coordinator 16 is further in communication with a plurality of on-line storage repositories 20. On-line storage repositories 20 are network accessible data storage repositories that may be provided by third party service providers, or may be privately hosted network accessible storage devices, or a combination thereof. Suitable on-line storage repositories 20 include Amazon AWS; Microsoft Azure; Google Cloud; Redis; Memcache; Database Table or any other network accessible storage. To that end, storage coordinator 16 may further and execute software access components 62 allowing storage coordinator 16 to log-in and access remote storage at storage repositories 20, in accordance with APIs made available by the storage repository providers. Specifically, access components 62 allow writing of data to, and reading of data to repositories 20.

Each fragment generated by data splitting function 60 may be associated with a block identifier and written to repositories 20. The block identifier will be unique, at least within each repository. M fragments are preferably written to M different ones of repositories 20.

Data to be stored is thus stored in data repositories 20, and is striped across several of data repositories 20. As will be appreciated, striping or data striping refers to known techniques to distribute sequential data blocks in fragments across multiple repositories. As used herein, a file is divided into blocks, and blocks are striped in fragments. The amount of data in one block (stripe unit), often denominated in bytes is defined in the vault metadata. Likewise, M and N used by the data splitting function 60 is configured in this metadata.

Access component 62 thus allows an abstraction between the storage coordinator 16 and the actual storage of data in repositories 20. Access component 62 treats data to be stored in key-value store and may provide the following for each of repositories 20 calls:

void putData(byte[] key,byte[] value)
byte[] getData(byte[] key)

For each block, the key value may be a block identifier—composed for example of a unique identifier for the file of which the block is a part, and an offset.

Storage coordinator 16 is in communication with metadata, indexing the data that has been striped across multiple repositories 20 to allow striped data to be so stored, and to be re-assembled. In this way, data accessed by a user device (such as end-user device 18) through access device 12, including individual files, may be stored across multiple disparate network accessible storage repositories.

As illustrated in FIG. 3, storage coordinator 16 is in communication with memory for storing metadata, as detailed below, as well as functional component for encrypting/decrypting data and striping data across multiple ones of storage repositories 20. Metadata may be stored in local memory or network accessible memory, and may be stored in repository 20.

Conveniently, file data is both encrypted and striped across repositories 20. No single repository 20 stores sufficient data to allow meaningful reconstruction of the stored data in a file. Encryption further ensures that only access device 12 can obtain the plain text (decrypted) data from repository 20.

Metadata used by storage coordinator 16 is hierarchically arranged. The metadata is also encrypted. Some metadata can be accessed by storage coordinator 16, using encryption keys accessible by storage coordinator 16, and stored at key management device 14. Other metadata can only be accessed by access device 12, using the KeKs accessible to it, or a combination of access device 12 and storage coordinator 16.

Figure 6:
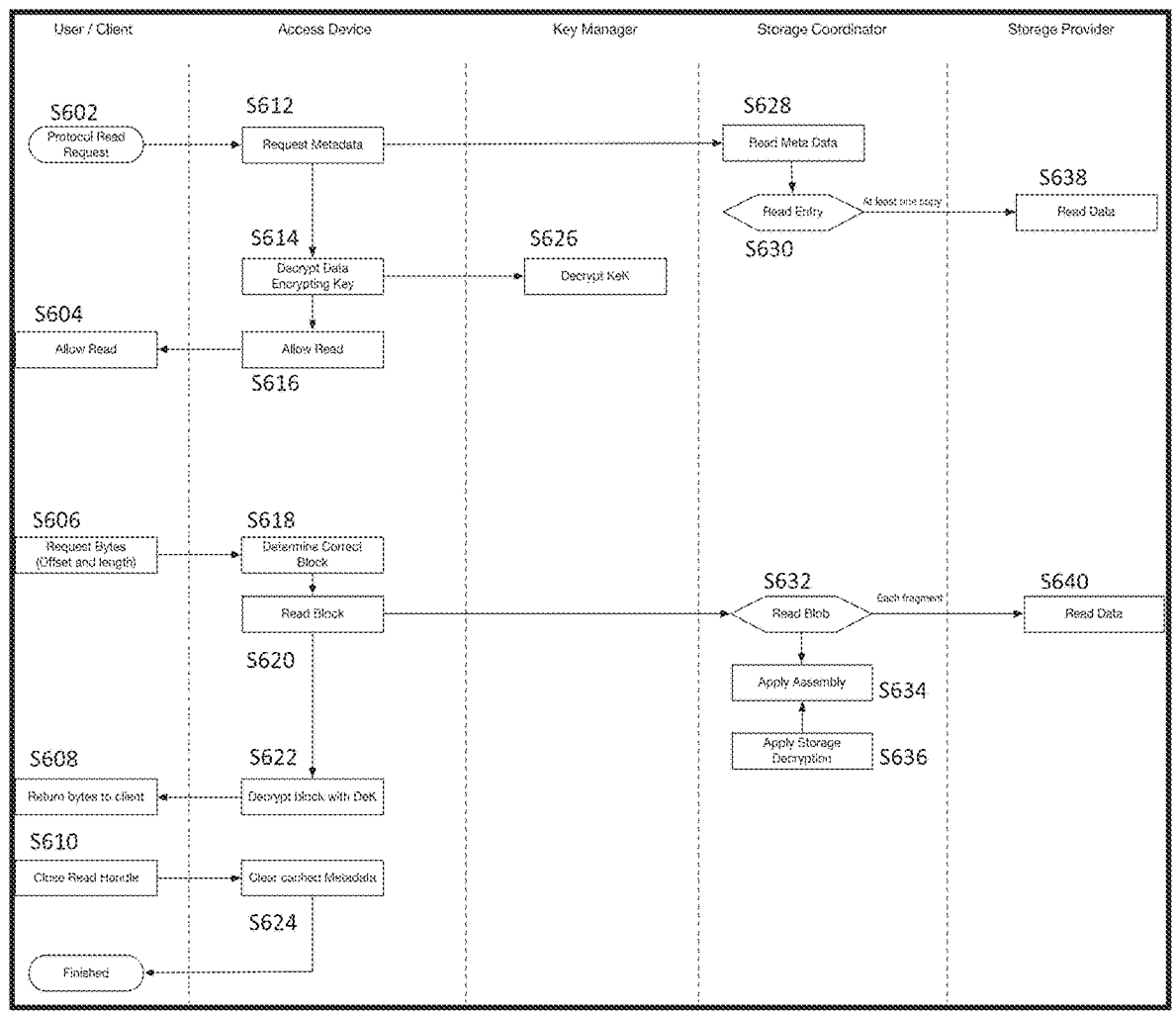
FIGS. 6-9 are flow charts of the operation of the environment of FIG. 1.

Tree data structure 80 depicted schematically in FIG. 6 has a plurality of hierarchically arranged nodes 82. Each of the hierarchically arranged nodes 82 has a node identifier. Each node 82 is represented by a metadata entry, described below. Each node 82 may also be associated a file is striped across several of the multiple data repositories 20, as identified in the metadata.

Each metadata entry of nodes 82 is at least partially encrypted, and contains sufficient information to allow traversal of the tree data structure 80 to an adjacent one of the hierarchically arranged nodes 82, and retrieval of blocks associated with that node from the multiple data repositories 20. Storage coordinator 16 can identify nodes requested by access device 12, and so that storage coordinator 16 can traverse the tree data structure 80. Metadata is at least partially encrypted so that storage coordinator 16 cannot typically locate fragments associated with the metadata, or decrypt the fragments, or even associate them with a particular file without an encryption key (typically the vault key KeK) available only to access device 12.

In the depicted embodiment metadata entry of each node 82 is stored as a block, having a block identifier corresponding to the file associated with the node, and a block offset of 0.

Figure 5:
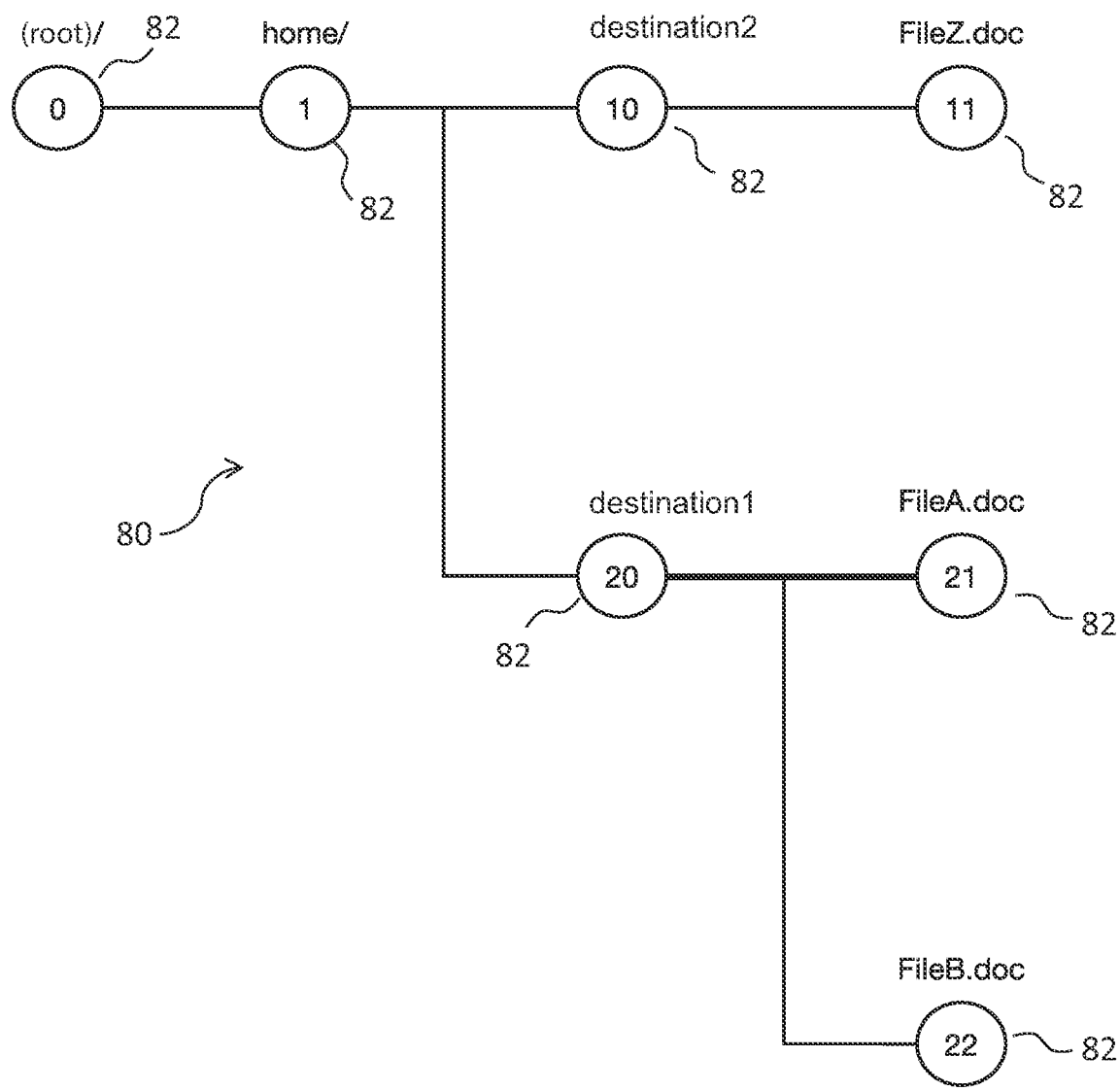
FIG. 5 is block diagram of a hierarchical tree data storage used in the environment of FIG. 1.

In the below examples, parent and entry id's are shown as simplistic numbers—represented by 0, 1, 10, 20, 11, 21 and 22 in FIG. 5. In reality, these values are typically GUID's, with the exception of the root entry which is identified using a known value—e.g. "0".

Example metadata in JSON corresponding to a portion of tree data structure 80 is further depicted in FIGS. 5A and 5B. Specifically, metadata corresponding to nodes ID 0; ID 1; ID 20; and ID 21 are depicted.

File metadata entries of tree data structure 80 have two components:
  general details that can be decrypted by storage coordinator 16 and are used for access (e.g. permission, encrypted node id, status, encrypted parent-id, encryption flags); and
  secure details can only be decrypted by/through access device 12 (e.g. file/node name, size, block size, block id).

In the JSON of FIGS. 5A and 5B, the general details for each node have labels vault-id; id; parent id; user id; group id; permission bits; revision; status; type; encryption. The secure details have the label secure-data. As will be appreciated, other metadata structures are possible.

Multiple independent tree structures (like data tree structure 80) may be stored for use by storage coordinator 16. Each tree structure is specific to a particular vault, and is associated with the vault identifier.

Each file to be stored through storage manager 16, is associated with a randomly generated data encryption key (DeK). DeKs are further encrypted using the vault KeK assigned per vault. Encrypted DeKs are stored within file metadata for that file in tree data structure 80. DeK can be regenerated to allow automatically or manually initiated rekeying of data at any time.

In the tree data structure 80, each node has a single parent, and a parent may have many children. The root of the tree is an entry with id "0"—as for example illustrated in FIG. 5.

In order to access files, access device 12 may request nodes having an encrypted identifier corresponding to the root node of hierarchical structure—"0"—, as well as nodes having this encrypted node id "0" as parent (using the parent id), from storage coordinator 16. The same can be said of other nodes in the data tree—they may be requested based on the parent id. However, storage coordinator 16 is unable to decrypt the encrypted identifiers—as this requires the vault key—which is available to access device 12, but not storage coordinator 16.

All calls are made in the context of a vault-id (i.e. vault-id=100), that identifies tree data structure 80 among multiple such data tree structures accessible by storage coordinator 16 or access device 12.

Blocks performed in an example read to be performed by end-user device 18, is depicted in FIG. 6. In order to perform the file read, a user at end-user device 18 requests a file of interest, for example "home/destination1/FileA.doc" in block S602. This request is passed to access device 12, using a suitable protocol understood by both end-user device 18 and access device 12—e.g. FTP; SMB; or another protocol described above.

Access device 12 under control of exemplary software, in turn, requests metadata from storage coordinator 16 in blocks S612 in order to locate the requested file. Specifically, in order for access device 12 to access the data tree associated with the vault-id, access device 12 requests the root node of the data tree associated with the vault-id from storage coordinator 16 in block S612.

A call to storage coordinator 16 for all entries with a parent-id=0—in the example, returns a single entry for id 1, corresponding "home/" entry, retrieved in block S628, S630 and S638. The results are returned to access device 12, and decrypted at access device 12 in block S614, using the DeK within the retrieved metadata and the KeK for the vault. The matching entry for "home" is selected. As required, access device 12 access key management device 14 for vault key in block S626

Blocks S602, S612, S628, S630, S638 and S614 are repeated, with a call for all entries with a parent-id=1, returning entries 10 and 20, corresponding to "destination2" and "destination1" entries. Storage coordinator 16 may retrieve such entries, without decrypting them. The results are passed to access device 12, and decrypted by access device 12 using DeK within the retrieved metadata and the KeK for the vault nd the matching entry for "destination1" (id 20) is selected in blocks S616 and S614, and provided to end-user device 18 in block S604, if requested.

Blocks S602, S612, S628, S630, S638 and S614 are again repeated and a call is made for all entries with a parent-id=20. Again, these are retrieved by storage coordinator 16, and passed to access device 12. At access device 12, the results are decrypted and the matching entry for "FileA.doc" (id 21) is selected.

Access device 12 caches retrieved metadata entries locally in its memory to reduce the number of actual calls required.

Once "FileA.doc" is requested (by its encrypted identifier) by access device 12, from storage coordinator 16, storage coordinator 16 further retrieves/decrypts the file associated with "FileA.doc" in blocks S606, S618, S620, S632, S640, S634, S636, fragment by fragment and block by block. The returned data is decrypted by access device 12 in block S622, and returned to end-user device 18 in block S608.

Once an identified file has been retrieved, the file read is terminated in block S610, and cached at access device 12 may be cleared in block S624.

Figure 8:
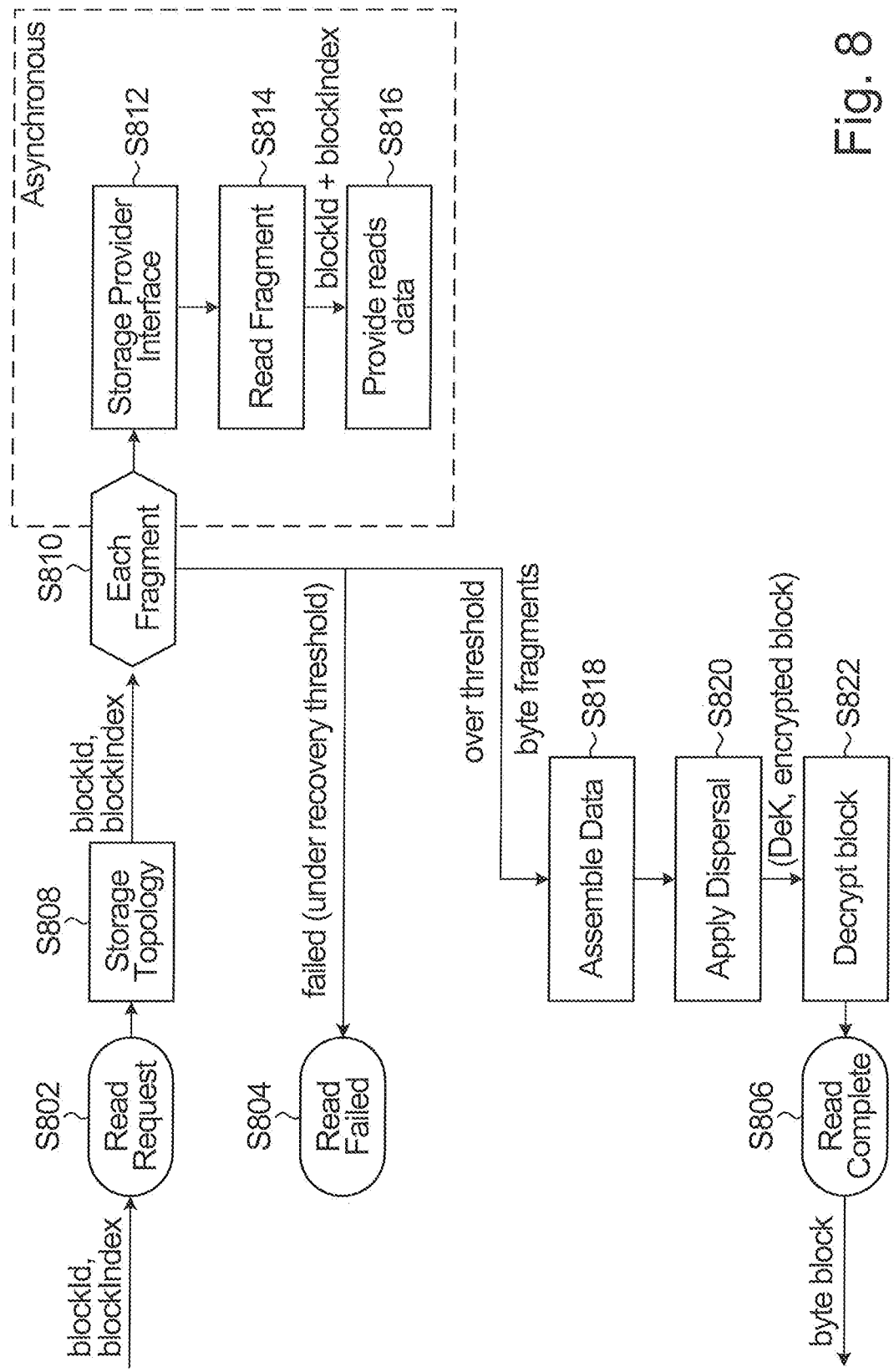

Data reads as performed in block S620, S632, S634, S636 and S640 are further detailed in FIG. 8. As illustrated a read request for a block is received at storage coordinator 16 in block S802. The storage topology across repositories is determined in S808 using the vault metadata. In blocks S812, S814 and S816 each fragment for the requested block is requested from data repositories 20. Any read failure may be signalled in block S804. The read fragments are re-assembled in block S818 using the transformation (as used to stripe the block across repositories 20) in blocks S820 and S822, and a completed read is signalled in block S810. The data is then decrypted by storage coordinator 16 in block S822 and provided to access device 12, for further processing/decryption.

Figure 7:
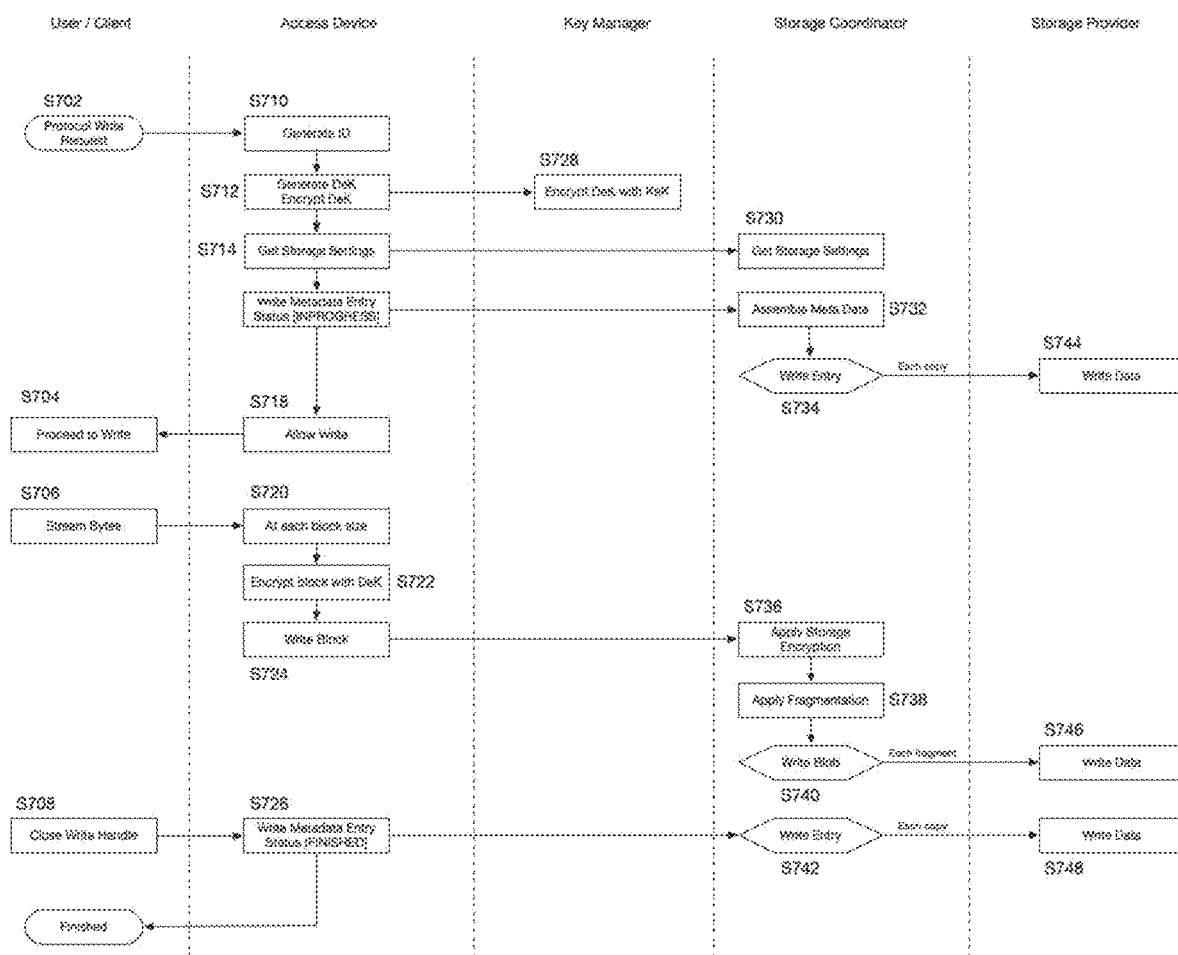

A user may similarly create a new file, for example "/home/destination1/FileB.doc", as illustrated in FIG. 7. End-user device 18 using a conventional api/operating system call requests creation of a new file to access device 12 in block S702. Access device 12 generates a random identifier for the file in block S710, and obtains an encrypted version of a DeK from key management device 14 in block S712. Access device 12 then encrypts the random identifier using the DeK for the file. Access device 12 obtains the storage settings for vault, as created and stored by interface 22, in block S730 and provides a request to create the metadata entry for the file in block S716. Storage coordinator 16 adds metadata corresponding to the node representing the newly created file to tree data structure 80 in blocks S732 and S734 and writes the metadata to storage (in this case repositories 20) in block S744. Access device 12 allows further writes by end-user device 18 in blocks S718 and S704.

A new metadata entry is created that has a parent-id=20, in blocks S710, S712, S716, S728, S730, S732, S734, S744 and S704. Specifically, a write request is generated at end-user device 18 in block S702 and provided to access device 12.

Access device 12 requests encryption of a random DeK from key management device 14 in block S712. The DeK is encrypted using the KeK and provided in block S728. Access device 12 further obtains storage settings from storage coordinator 16 in blocks S714 and S730.

The metadata entry is created by determining a block size; generating a block ID (GUID); generating a random encryption key for encrypting the data (DeK); encrypting the DeK with a key encryption (KeK) retrieved from key management device 14; Encryption section added with KeK(DeK) +KeK ID.

In block S716, S732, S734 and S744 the metadata for the file is broken into fragments and written to storage repositories 20.

The file size as well as a block size is stored in the metadata. The block size can be variable to optimize it based on the file size and read patterns. Access device 12 sends the metadata entry to the storage coordinator 16 to be written in block S716.

Blocks representing the file are next written in block S706, S720, S722, S724, S736, S738, S740, S746. Specifically, end-user device 18 streams data to be written using a standard storage protocol in blocks S706. The data to be written is divided into blocks as defined in vault metadata, and is encrypted with the DeK for the file by access device 12, and provided to storage coordinator 16 for writing in block S724. At storage coordinator 16, each block is fragmented in block S738. Optionally, fragmented blocks may be further encrypted using a vault specific key that may also be stored at key management device 14. Fragmented blocks are written to repositories 20 in blocks S740 and S746. Fragments created at storage coordinator 16 are stored in association with a key, that is derived from the file id and the block number, encrypted using the vault KeK, and further encrypted using the storage provider DeK.

Once the file has been written, the metadata blocks may be updated to reflect the write in blocks S726, S742 and S748 and the write handle for the file may be closed at end-user device 18.

The above examples assume that storage parameters for a particular vault have been pre-configured. For example, for a vault identifier of 100 (unique vault id), index entries are written to three providers. Blocks are striped across four providers, using a 3 of 4 all or nothing transform. Some metadata entries may be stored locally on the storage coordinator using a Redis back end. Metadata and block entries will be stored across AWS and Azure repositories.

Blocks, at the access layer, supports compression before encryption to reduce actual storage size. This is configurable on a file/directory basis. The block header indicates if encryption is used.

Block IDs in the metadata storage are encrypted so that the blocks of a file cannot be identified.

Figure 9:
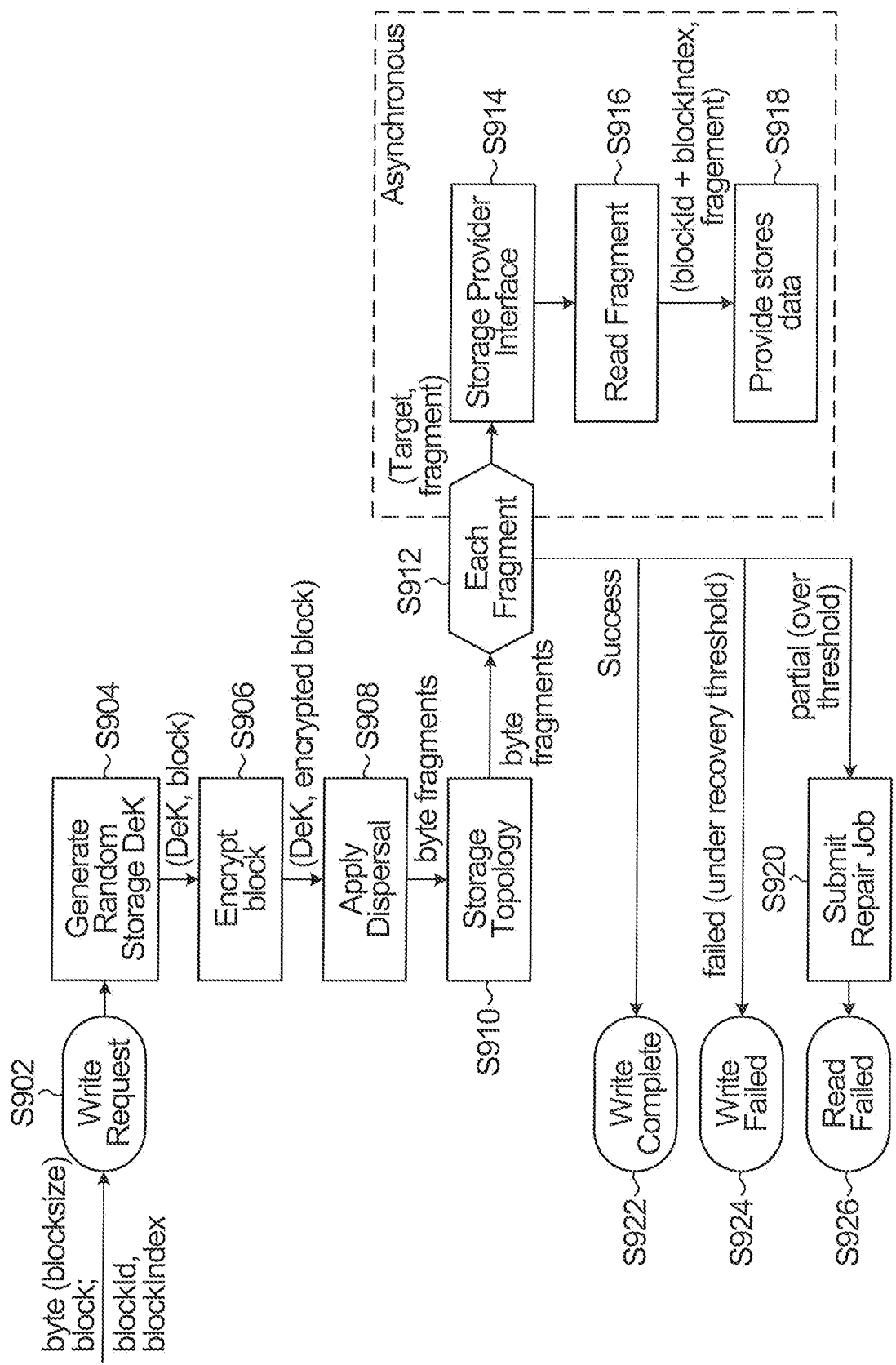

Writes as performed in block S724, S736, S738 and S740 are further detailed in FIG. 9. As illustrated a write request for a block is received at storage coordinator 16 in block S902. Data as encrypted by access device 12 is received. In block S904 a further random DeK is generated. The data block may be further encrypted in block S906. In block S908 a dispersal algorithm provided by block 60 is applied to the data block, as encrypted. This yields multiple (M) fragments that are written across data repositories 20 in blocks S912, S914, S916, S918. The status of the write for each fragment is returned in blocks S922, S924, and S926 (with any suitable repair occurring in block S920).

An example flow shows browsing a directory. All lookups require starting at the root of the structure, and access device 12 caching provides a significant reduction is traversal time. Call-back notifications to storage coordinator 16 provide real-time notification of parent changes requiring a reload This example below illustrates navigating to directory '/home/destination2/'. Reference is made to blocks in FIG. 6.

| BLOCK | Technical Details | Notes |
|---|---|---|
| S612 | Access Device generates the encrypted root id for the vault. ParentId: "00000000-0000-0000-0000-000000000000" Encrypted:\|\| "8A299C4F319DEB670EF6226E675F9E20BCAF656C2EC0F 081A60738DBDA5BCE118641 DDB19AF36546B5B256E6514 3353E" | The root id for a vault is an all 1 0 GUID |
| S612 | Access device calls storage coordinator to search for i] metadata with parent id = 8A299C4F319DEB670EF6226E675F9E20BCAF656C2EC0F 081A60738DBDA5BCE118641DDB19AF36546B5B256E6514 3353E | |
| S628, S630, S638 | Storage coordinator finds 1 entry matching and returns it | Entry is encrypted |
| S614 | Access device decrypts the entry and confirms that the name = "home". The entries ID is obtained. Id: d9775c67-f78d-44fa-b464-87f57480bfff Encrypted: D9AD561B666C02C97270FD636482CDFC7BF1D2178285C5 5D9A48B9A894986606402A215D88FA66C39410E3125E294 799 | |
| S612, S628, S630, S638, S614 repeated | A search is completed for all entries with parent id = D9AD561B666C02C97270FD636482CDFC7BF1D2178285C5 5D9A48B9A894986606402A215D88FA66C39410E3125E294 799 | |
| S628 | Storage coordinator finds 2 entries, each is decrypted and the entry for 'destination1' is skipped and the entry for 'destination2' is selected. The 'destination2' entry is has an ID of 28498040-b9c6-4e8f-b998-9f4e44013d70, which is used as the parent for all file operations in this directory. The encrypted version is 59978A6422C80A6845521845ADBF751E8CB2A12BD52032 C0F547D6BEDE32CDDBE401513F4F476B751970CBAFEDD 6E76B A search is completed for all entries with parent id = 59978A6422C80A6845521845ADBF751E8CB2A12BD52032 C0F547D6BEDE32CDDBE401513F4F476B751970CBAFEDD 6E76B This returns all files and folders in this directory, these would be decrypted and displayed to the user in the protocol specific format. | These steps could be repeated as many times as needed to get to the correct depth/path Caching would track the relationship between/ destination2/home and ID = 28498040-b9c6-4e8f-b998-9f4e44013d70 for subsequent lookups |

A further example flow illustrates writing a file /home/destination2/TestDocument.docx having a file size of 130KB. Reference is made to blocks in FIG. 7. The example assumes that the user has already navigated to the directory and has obtained the directory id of the parent. Target directory id is: 028498040-b9c6-4e8f-b998-9f4e44013d70.

| BLOCK(S) | Technical Details | Notes |
|---|---|---|
| S702 | End-user device requests a write | Technical details are per protocol |
| S704 | Generate a document ID (GUID)<br>Docid=ff55778b-cb08-4865-a48d-3176a5de8226<br>Generate a block ID<br>Blockid=cb8a3726-4380-4e29-a77b-29227fd638ca | |
| S728 | Generate a document specific encryption key | Specific key algorithm is per-vault (i.e. AES256) |
| S712 | Generate a Data Encryption Key and encrypt it using the Key Encrypting Key<br>dek=22ED2FFED36A51C7C15547D12D7BCBA263786F26E E98D240C8B28EA511B75675<br>salt=76CD28CB20CAFD87<br>e(dek)=776C9D03C025E9D39B97D54B08402E34A353F0039 014A725B778E94C09C0E846<br>iv =E75C2F81F0426C16757C7F89EC7C4C65<br>kekId=vault100KeyV1 | Key is used to encrypt the data, e(dek) is the key encrypted version |
| S714 | Get storage settings from storage coordinator | Provides the file size |
| S730 | Return storage block settings<br>blockSize=4 KB | Size of original document drives the size |
| S716, S732, S734 | Create a meta-data entry using details above<br>E(guid)=DD3C625534F4B7B0F787A34CF4D167B2B014FC4 2457CD1F166E733611F8ABEB3E67D3E18FA5F002DCA6F E7333244B12A<br>E(parentid)=2A58FDBFBAC4AA9FEB337A610057D0183944 FE0B34C60A86F748A339184F7B3BBD98BF2C6FA048FE73 4D954B58BA6631<br>Meta Data block (Pre-Encryption)<br>[<br>  {<br>    "id": "DD3C625534F4B7B0F787A34CF4D167B2B014FC42457CD1F166 E733611F8ABEB3E67D3E18FA5F002DCA6FE7333244B12A",<br>    "parent-id": "2A58FDBFBAC4AA9FEB337A610057D0183944FE0B34C60A86F7 48A339184F7B3BBD98BF2C6FA048FE734D954B58BA6631",<br>    "user-id": 100,<br>    "group-id": 1000,<br>    "permission-bits": 660,<br>    "status": "InProgress",<br>    "revision": 1,<br>    "encryption": {<br>      "kek-id": "vault100KeyV1",<br>      "dek": "776C9D03C025E9D39B97D54B08402E34A353F0039014A725B77 8E94C09C0E846"<br>    },<br>    "secure-data": {<br>      "name": "TestDocument.docx",<br>      "createdt": "2019-09-03T12:35:00Z",<br>      "updatedt": "2019-09-03T12:35:00Z",<br>      "file-size": "132096,<br>      "block-size": 4096,<br>      "block-id": "cb8a3726-4380-4e29-a77b-29227fd638ca",<br>      "meta-data": [<br>        {<br>          "mime-type": "application/vnd.openxmlformats-officedocument.wordprocessingml.document"<br>        },<br>        {<br>          "classification": ["pii","sensitive","human-resources"]<br>        }<br>      ]<br>    }<br>  }<br>]<br>Post-Encryption<br>[<br>  {<br>    "id": "DD3C625534F4B7B0F787A34CF4D167B2B014FC42457CD1F166 E733611F8ABEB3E67D3E18FA5F002DCA6FE7333244B12A",<br>    "parent-id": | Parent and GUID are encrypted.<br>The pre-encrypted value is show for illustration, the encrypted version is what is sent to the storage coordinator. |

-continued

| BLOCK(S) | Technical Details | Notes |
| --- | --- | --- |
| | "2A58FDBFBAC4AA9FEB337A610057D0183944FE0B34C60A86F748A339184F7B3BBD98BF2C6FA048FE734D954B58BA8631",<br>    "user-id": 100,<br>    "group-id": 1000,<br>    "permission-bits": 660,<br>    "revision": 1,<br>    "encryption": {<br>      "kek-id": "vault100KeyV1",<br>      "dek":<br>"776C9D03C025E9D39B97D54B08402E34A353F0039014A725B778E94C09C0E846"<br>    },<br>    "secure-data":<br>"8E87211E3F2266DAE82BFEBFC56A295B3CB5FE8AACA69450F01A685FF5125F3CE461056B20E0750F269A1C318B922B566AE04FBE9222CABC1ECD394F1B5DC29113F3E162C73A4EEE3CB0F4C32B4AC7B79CB832A7AA8ED12AB1DF0C27C984AC420489FF3E1157101E0354DD47BEBB299FD9F0E2A3DBB4FCD0F6D05A95F4432A79B3350E6949FFC6B0D642665FAD4B1FFAE4394AD08FDAC3433619E6EBFA4DF182B9D434DE2874CA62E3B7C9E83ACCE6530CEAEA59C1BE0CC61EB954B7CE33C9B741DCED80BFD0C3C1833B82F57A92EEB3B7C5A7C963ABA780D84F2D26B953EF78E0847E05EB1058B1B4EFD6C16456BAD6268BEF1D505064F0817975981D31CAF77B273D9CFA63D75B4D2D3B6A1D1445CAB5CCD43AA26F45C9DDF137A62D58B2C97E698BB558FA6984501C5D5183D65F5BB553D48C9D8457DE04CE58A33C043CC4301C982684E0169FFB07FA5B6DF6587B306DF7DB55B9349BEC1E7ECDDE6A4752F87132691E559A42321ED65B0FAF4BCF9B21568A7599880FAD9AC6FC1F40760D43F08BEED2D0820787A9419C0E8EDC9523C744ADF29DCC93F35AC616838185CCBD8A04700CBA31DE9BE641079AA8F5D9908920C50B3E8505D4714F9CFEE09163ACBF02F2E0C9918CC5117ED087B50D465C235CD78DFB756F5E2911713A6BE0AE"<br>    }<br>] | |
| 8 | Prepare the fragments for writing. Apply a dispersal algorithm to the encrypted meta data, and then apply the erasure coding.<br>Encrypt the metadata first:<br>Encrypted =<br>67D31E2A536F0324CBCAD9E87374B078A274D2230ED2D08943CEBD1F97222405F04E21DA0C9DE9F71A785BF65688FD3A47A30EA2EFAA1906032277870EB227DB0F451C08E9AEB86467AF562C4FAD94B3507A73A5299A6E4E063E89DB40B399B8907ECC922E7FFE4578FB112B622ED92474699D96A4447221F32BC134C78A37A094472AD0C65A0776FAE0E271F127F6DD77E23840D49D95E35BE65CD47D71F1DEC423CFCD9FF80D60C46E466C3E519690967E21B31018A9A989BD1B129CE950032DEC337454904ED34C71ADB5ADC1CEEBDF982F77F8D3CFEA83FBA33B7CAEF169977615E25C5344377B2AD2144529C51BACEE63AE247BA489F9D0C34E47339E3468F2D54A2E28CDF5BF65A7129B6F33ABBDA63F534A86A955B5F5886E494B92A31604506071A57E78FC52BF20AC7D1EB5D8478E037FDAF0F3357E697A15A7B3C47A72DEAF02964F0C107A9E5D151E840BC3CD962E2DDBEC938280F5CA669A45D3E04EB0DC13954FF7C9AA1A9BBF546598257090314ED1B3AD7C2669241D137F424C02FE75A4492883C08F3116F4B472AB9D857A6F6F1ADD5243341C6856E9DE28F55283F4C862673BCE3A9F18B7C88039314F15C04E4E84025AD2FA6E6F26FA275077E850EFABF255A06CFE04CA92C8DC2B86387EB20B6D5725411F032A0FCF3E6B29C4E52488CBFC6DB327FD87ABB78F6BC4EF0749321D957C2E0BA4A4375F500178CEE9AE64874898708309F4197667E83B6B04546694FBB93EAADB1AA14983D8E5FA8296FD57A35A85E57998E91A287FAAAEA2462253DC21B558FEDD81F983AB8C6A962C64FAD359C61327D4A625FFC6EEF8087E9EAF534F7EF366176613C80D9546E8E5E8CCC7793D51CCF189377532B4998B65757D67085FA1E2ACB94AC877324B205D20EF94D210AD3EDBCE8DCF6D23819E13D95A788104C7DD9AA3039DC6950AC6932FAB9BB82F18A6448562BCF918B30A5FCADEC4A98C24E4C9BE9C49D45F5DC8F2D1FA8226DA39F633165632DDDFDF921FDC45A71CB781C654FE7726EBC02E1F49960ACE68AED30CB83080DD308EB2F0BB7D6F097B011EF96656AF78DF03659D460F15EC9304785F1E3D4AC0DAA62D1828AF80E06E16B956791D79AEA0614256B07AFA3FBC62EAEF4C81B00CD0BEA1186EC05755B316DC201EF3A4017F9D3393AA4A6E5E86BB2656552F5E5294915827BD3DAA09198EC08D3FD64A7291DAFE7DECF3CB59B2518A9FE7F8897FAE4BE89FBDCA3E8B2F276083C3E3B83E954149784A890EAFE07FC0CC892C861BF76E6E0E3220B2409E0F8C9B91391865EB68E9B922C6C823EBE33779F2 | Assumes 3 fragments for this write, the original encrypted block is broken up using erasure coding to create fragments.<br>The lookup key is constructed using the block-id plus the block number. The block id for metadata is 0.<br>Each storage provider has its lookup key encrypted using the storage specific key. |

| BLOCK(S) | Technical Details | Notes |
| --- | --- | --- |

BAF557A65BB4248F6E9938183BB3B7CCE8377EADF16F8D2737D
73A2BBA445E923B394E0059C59407FB0E481C4142098C9D6AD8
F6FED0C427786EABCAFFBF09DBFA14B72E6B14108036719D012
2FCA77DAD4738FE5C01618FC94C354001E1578AEFD98B897F9E
1B72364D6FC7421EEED7EB5E9D62FB33134ED4505F925464505
0FCDAEE0F5F60A5AEE0E6FDDE73B4240ECB4C294A12171D66B
7C89A3C0B7F4F7055CD3AB930D84D37AE65126A6300E98AB8B5
B00EC01BC156E0E8CE19A966140C779A385054E902E7CA85E78
4BA2202AB3D7067806766A33FE9370A47308D84C9F4C049556F6
38082CD7EF01D26022453EDD577F6ED54C40946DFA7744F1B67
8B2DC88311671F39CD50D091CD80D24DC198A7E47E716E443EF
797DFA478AB5CDB30006334D44077283AD22DB3D403375E181D
F998FCAEF259603794A3884059C7CBC14AF80D33C2C5635ED61
BFDD4DF84E003E1AA67C0BB3A07FBC08CD6A491ACA21B3038
D7D9DF416507A45E689228492F017FCAF76FC5299D2A22720D37
4D173009DCAAAB285275C4828085431D65F69913403CA48547FD
5F6A162D675DFACA34B2B34C7E045832EDFE247C32A113BDEA
955F9D4D70AF7BD96C10190A3C85A598990E369288B24D8A24D
EC57B2F2CEC64E60589321CDA5900412F1DD3C0419B23CCEF9
36A39E503DAE958ABCF9DBE8CF069F752772D2AB5EBBFB38A4
2B10B97F43C3BD
Fragmented (illustration)/Pre-Encryption
"fragment1":"67D31E2A536F0324CBCAD9E87374B078A274D2230
ED2D08943CEBD1F97222405F04E21DA0C9DE9F71A785BF65688
FD3A47A30EA2EFAA1906032277870EB227DB0F451C08E9AEB86
467AF562C4FAD94B3507A73A5299A6E4E063E89DB40B399B890
7ECC922E7FFE4578FB112B622ED92474699D96A447221F32BC1
34C78A37A094472AD0C65A0776FAE0E271F127F6DD77E23840D
49D95E35BE65CD47D71F1DEC423CFCD9FF80D60C46E466C3E5
19690967E21B31018A9A989BD1B129CE950032DEC337459904ED
34C71ADB5ADC1CEEBDF982F77F8D3CFEA83FBA33B7CAEF169
977615E25C5344377B2AD2144529C51BACEE63AE247BA489F9D
0C34E47339E3468F2D54A2E28CDF5BF65A7129B6F33ABBDA63F
534A86A955B5F5886E494B92A31604506071A57E78FC52BF20AC
7D1EB5D8478E037FDAF0F3357E697A15A7B3C47A72DEAF02964
F0C107A9E5D1518E840BC3CD962E2DDBEC938280F5CA669A45D
3E04EB0DC13954FF7C9AA1A9BBF546598257090314ED1B3AD7C
2669241D137F424C02FE75A4492883C08F3116F4B472AB9D857A
6F6F1ADD5243341C6856E9DE28F55283F4C862673BCE3A9F18B
7C88039314F15C04E4E84025AD2FA6E6F26FA275077E850EFAB
F255A06CFE04CA92C8DC2B86387EB20B6D5725411F032A0FCF3
E6B29C4E52488CBFC6DB327FD87ABB78F6BC4EF0749321D957
C2E0BA4A4375F500178C"
"fragment2":"8B7C88039314F15C04E4E84025AD2FA6E6F26FA275
077E850EFABF255A06CFE04CA92C8DC2B86387EB20B6D572541
1F032A0FCF3E6B29C4E52488CBFC6DB327FD87ABB78F6BC4EF
0749321D957C2E0BA4A4375F500178CEE9AE64874898708309F4
197667E83B6B04546694FBB93EAADB1AA14983D8E5FA8296FD5
7A35A85E57998E91A287FAAAEA2462253DC21B558FEDD81F983
AB8C6A962C64FAD359C61327D4A625FFC6EEF8087E9EAF534F7
EF366176613C80D9546E8E5E8CCC7793D51CCF189377532B499
8B65757D67085FA1E2ACB94AC877324B205D20EF94D210AD3ED
BCE8DCF6D23819E13D95A788104C7DD9AA3039DC6950AC6932
FAB9BB82F18A6448562BCF918B30A5FCADEC4A98C24E4C9BE9
C49D45F5DC8F2D1FA8226DA39F633165632DDDFDF921FDC45A
71CB781C654FE7726EBC02E1F49960ACE68AED30CB83080DD3
08EB2F0BB7D6F097B011EF96656AF78DF03659D460F15EC93047
85F1E3D4AC0DAA62D1828AF80E06E16B956791D79AEA0614256
B07AFA3FBC62EAEF4C81B00CD0BEA1186EC05755B316DC201E
F3A4017F9D3393AA4A6E5E86BB2656552F5E5294915827BD3DA
A09198EC08D3FD64A7291DAFE7DECF3CB59B2518A9FE7F8897
FAE4BE89FBDCA3E8B2F276083C3E3B83E954149784A890EAFE0
7FC0CC892C861BF76E6E0E3220B2409E0F8C9B91391865EB68E
9B922C6C823EBE33779F2BA"
"fragment3":"F557A65BB4248F6E9938183BB3B7CCE8377EADF16
F8D2737D73A2BBA445E923B394E0059C59407FB0E481C4142098
C9D6AD8F6FED0C427786EABCAFFBF09DBFA14B72E6B1410803
6719D0122FCA77DAD4738FE5C01618FC94C354001E1578AEFD9
8B897F9E1B72364D6FC7421EEED7EB5E9D62FB33134ED4505F9
254645050FCDAEE0F5F60A5AEE0E6FDDE73B4240ECB4C294A1
2171D66B7C89A3C0B7F4F7055CD3AB930D84D37AE95126A6300
D98AB8B5B00EC01BC156E0E8CE19A966140C779A385054E902E
7CA85E784BA2202AB3D7067806766A33FE9370A47308D84C9F4
C049556F630082CD7EF01D26022453EDD577F6ED54C40946DFA
7744F1B678B2DC88311671F39CD50D091CD80D24DC198A7E47E
716E443EF797DFA478AB5CDB30006334D44077283AD22DB3D40
3375E181DF998FCAEF259603794A3884059C7CBC14AF80D33C2

| BLOCK(S) | Technical Details | Notes |
|---|---|---|
| | C5635ED61BFDD4DF84E003E1AA67C0BB3A07FBC08CD6A491A CA21B3038D7D9DF416507A45E689228492F017FCAF76FC5299D 2A22720D374D173009DCAAAB285275C4828085431D65F6991340 3CA48547FD5F6A162D675DFACA34B2B34C7E045832EDFE247C 8B24D8A24DEC57B2F2CEC64E60589321CDA5900412F1DD3C04 19B23CCEF936A39E503DAE958ABCF9DBE8CF069F752772D2AB 5EBBFB38A42B10B97F43C3BD" Generate the Key for storage. Use the ID + Block #. The meta data entry is always block 0. FF3C625534F4B7B0F787A34CF4D167B2B014FC42457CD1F166E 733611F8ABEB3E67D3E18FA5F002DCA6FE7333244B12A-Block0 Each key is encrypted: "key1": "2BE9EB30684CB1754BC43C4925FABD46137E89F0C54F3B61EF 056C6202221FB8A16E3578BCF7113E8E96DA6CFCF761B2C9711 88DA1CA40D561F3D1F6F8017029153049AEA2A1EBB8FC1ED3D 5F208D9E14CC2A0A86E8EAB1178C3E8322D89BB89291F655D2B D5BC87C8138A391BD46643", "key2": "3D432B4CF93E115688D303469A4266E40D607973F44CF032BB9 5585756F7D9526391521139077857CB3C882C47B05269322ABAB C8B1DF17824D52AB0C47E92AC334889214048923BB1BF2F35325 D9BA21ED459B56D506C55F344456819DF4B16C6995C67C4B211 8D2F35DAB5ED1EBF0C", "key3": "F789E5B502802DA4066A60AF60E8E92997934368618109B4761B F598CC68F956B56A1598A319ED40D50B7BE3C93130DAA0C8058 3836E519594CD86AA6F5E3BE8B70D49F39C04D51E859F6C2253 6D21AC451CE1C69BAA64C5B8B08115186C813E5E1B0E92E3484 17E8B08DB1104A6E905" | |
| S744 | Write the entry to each of the 3 metadata providers using data from step 8. local-redis-1: putData (key1, fragment1) azure-blob-1: putData (key2, fragment2) aws-s3-1: putData (key3, fragment3) | |
| 10 | Storage provider does writes per protocol specifics | |
| 11 | Document write is allowed, allow writing to proceed | |
| 12 | Protocol specific positive response for the write ---- NEXT STEP ---- | |
| S706 | Protocol starts to write real bytes, using SMB as an example the block arrives in 64 KB | Protocol specific write, the block sizes of the writes can be anything, for example in SMB blocks are 64 KB A full write will require 3 packets, 64 KB, 64 KB, 1 KB |
| S720 | As the bytes are received, each time the block size of 4 KB is reached the block write will happen. For a 64 KB block this will happen 16 times. Each block is numbered based on position in the file, for the first 64 KB chunk of data the blocks are 1 to 16 | There will be a total of 33 blocks created, 32 × 4 KB and the remaining 1 KB block as the last write |
| S722 | Each 4 KB block of data is encrypted using the DeK key from step 4 Block = byte[4096] E(block) = dek(byte[4096]) | |
| S724 | Write the block to the storage coordinator, BlockId: DD3C625534F4B7B0F787A34CF4D167B2B014FC42457CD1F166E 733611F8ABEB3E67D3E18FA5F002DCA6FE7333244B12A BlockNumber: 1 Block Data: byte[4096] | |
| S736 | Generate a random encryption key to apply to the block data. Encrypt the block, then encrypt that random data encryption key using a vault Key encrypting key | Each block will have a new random Key |
| S738 | Apply fragmentation as per dispersal algorithm, For this example 4 fragments are created. | |
| S740 | Write each fragment to the storage provider. Each key for each storage provider is encrypted. Azure-blob-1: putData (key1, fragment1) azure-blob-2: putData (key2, fragment2) aws-s3-1 : putData (key3, fragment3) aws-s3-2: putData (key4, fragment4) | |
| S746 | Storage provider does writes per protocol specifics --REPEAT STEPS for each block, repeating steps for all data in the file. | |
| 21 | Protocol requests a file close | Cancel would follow the same flow but the status would change to cancelled. |

-continued

| BLOCK(S) | Technical Details | Notes |
|---|---|---|
| 22 | Metadata write occurs following the same step as 7, using existing block id's and keys. Any file size corrections are applied and the status is changed to "Active" | |
| 23 | Metadata write occurs following the same flow as steps 8-10 | |
| 24 | Protocol specific close file handling occurs | |

Of course, the above described embodiments are intended to be illustrative only and in no way limiting. The described embodiments are susceptible to many modifications of form, arrangement of parts, details and order of operation. The invention is intended to encompass all such modification within its scope, as defined by the claims.

What is claimed is:

1. A method of storing data in multiple data repositories, comprising:
   storing, for access by a storage coordinator, a tree data structure having a plurality of hierarchically arranged nodes, wherein each of the hierarchically arranged nodes is associated with a file and contains metadata about that file;
   receiving, by the storage coordinator, the data in each file to be stored; and
   storing, for access by the storage coordinator, the data in each file in the multiple data repositories, wherein each file is striped across several of the multiple data repositories by dispersing fragments of the file across the several of the multiple data repositories, such that no single data repository allows meaningful reconstruction of the file;
   wherein each of the nodes in the tree data structure is at least partially encrypted, and contains sufficient metadata to allow traversal of the tree structure to an adjacent one of the hierarchically arranged nodes in the tree data structure, and retrieval of the data in the file associated with that node from the multiple data repositories;
   and wherein the metadata identifying the adjacent node may be accessed by said storage coordinator.

2. The method of claim 1, wherein each file is divided into blocks, and wherein each block is divided into the fragments striped across the several of the multiple data repositories.

3. The method of claim 1, wherein each block is divided into M of the fragments, of which N are required to reconstruct that block, with N≤M.

4. The method of claim 3, wherein each of the nodes is striped across M of the multiple data repositories.

5. The method of claim 1, wherein the data is provided to the storage coordinator from an access device accessible to an end user device using a file storage protocol.

6. The method of claim 5, wherein the file storage protocol comprises one of FTP; HTTP; SMB; AFP; NFS; SFTP; UPnP; or AFS protocol.

7. The method of claim 6, wherein the storage coordinator, access device and data repositories are interconnected by at least one data network.

8. The method of claim 5, wherein each node contains metadata identifying the file associated with that node, and wherein the metadata identifying the file can only be decrypted using a key available to the access device.

9. The method of claim 5, wherein the metadata identifying the adjacent node at each of the nodes identifies a parent of that node.

10. The method of claim 9, wherein each file is encrypted with a unique key, and wherein an encrypted unique key is stored in the associated metadata.

11. A non-transitory computer readable medium storing computer executable instructions that when performed by at least one computing device cause the computing device to perform the method of claim 1.

12. A method of storing a file across multiple data repositories, comprising:
   receiving the file to be stored;
   forming file metadata identifying the file within a directory structure;
   including a link in the file metadata linking it to metadata associated with at least one other file in a tree data structure of hierarchically arranged nodes;
   encrypting a portion of the file metadata identifying the file and allowing retrieval of the file from the multiple data repositories;
   appending the partially encrypted file metadata to the tree data structure and storing the tree data structure;
   storing the file to be stored across the multiple data repositories, wherein the file is striped across several of the multiple data repositories by dispersing fragments of the file across the several of the multiple data repositories, such that no single data repository allows meaningful reconstruction of the file; and
   wherein the file metadata allows traversal of the tree structure by identifying an adjacent node in the tree data structure, and wherein the file metadata identifying the adjacent node may be accessed by a storage coordinator.

13. The method of claim 12, further comprising dividing the file into multiple blocks, and encrypting the blocks with a data encryption key.

14. The method of claim 13, further comprising encrypting said data encryption key and including the data encryption key as encrypted in the file metadata.

15. The method of claim 14, further comprising providing said metadata for access by a storage coordinator.

16. The method of claim 14, further comprising providing said multiple blocks to said storage coordinator for storage across said multiple repositories.

17. The method of claim 16, wherein each block is divided into M of the fragments, of which N are required to reconstruct that block, with N≤M.

18. A method of storing data in multiple data repositories, comprising:
   storing, for access by a storage coordinator, a tree data structure having a plurality of hierarchically arranged nodes, wherein each of the hierarchically arranged nodes is associated with a file and contains metadata about that file;
   receiving, by the storage coordinator, the data in each file to be stored; and
   storing, for access by the storage coordinator, the data in each file in the multiple data repositories, wherein each file is striped across several of the multiple data repositories by dispersing fragments of the file across the several of the multiple data repositories, such that no single data repository allows meaningful reconstruction of the file;

wherein each of the nodes in the tree data structure is at least partially encrypted, and contains sufficient metadata to allow traversal of the tree structure to an adjacent one of the hierarchically arranged nodes in the tree data structure, and retrieval of the data in the file associated with that node from the multiple data repositories;

and wherein each node contains metadata identifying the file associated with that node, and wherein the metadata identifying the file can only be decrypted using a key available to an access device accessible to an end user.

* * * * *

UNITED STATES PATENT AND TRADEMARK OFFICE
CERTIFICATE OF CORRECTION

PATENT NO. : 11,675,739 B1
APPLICATION NO. : 16/579379
DATED : June 13, 2023
INVENTOR(S) : Derek Schenk and Ed Leavens Page 1 of 1

It is certified that error appears in the above-identified patent and that said Letters Patent is hereby corrected as shown below:

In the Claims

Column 21:
Claim 3, Line 49, "reconstruct that block, with N£M" should read ---reconstruct that block, with N≤M---.

Column 22:
Claim 17, Line 55, "reconstruct that block, with N£M" should read ---reconstruct that block, with N≤M---.

Signed and Sealed this
Nineteenth Day of November, 2024

Katherine Kelly Vidal
*Director of the United States Patent and Trademark Office*